United States Patent
Sellers (10) Patent No.: US 6,910,685 B2
(45) Date of Patent: Jun. 28, 2005

(54) METHOD OF MANUFACTURING AN ELEVATED NON-SLIP CUTTING BOARD

(76) Inventor: Kathleen R. Sellers, 3594 S. Ocean Blvd., #301, Highland Beach, FL (US) 33487

( * ) Notice: Subject to any disclaimer, the term of this patent is extended or adjusted under 35 U.S.C. 154(b) by 163 days.

(21) Appl. No.: 10/263,155

(22) Filed: Oct. 2, 2002

(65) Prior Publication Data

US 2003/0071406 A1 Apr. 17, 2003

Related U.S. Application Data

(63) Continuation-in-part of application No. 09/661,072, filed on Sep. 13, 2000, now Pat. No. 6,478,292.

(51) Int. Cl.$^7$ ................................. B23Q 3/00
(52) U.S. Cl. .................... 269/289 R; 269/285; 269/286
(58) Field of Search .................... 269/289 R, 302.1, 269/285, 286; 254/DIG. 1; 248/633

(56) References Cited

U.S. PATENT DOCUMENTS

| | | | | |
|---|---|---|---|---|
| 3,710,653 A | * | 1/1973 | Miller | 81/3.5 |
| 4,482,592 A | * | 11/1984 | Kramer | 428/67 |
| 4,686,725 A | * | 8/1987 | Mitchell | 5/692 |
| 4,930,759 A | * | 6/1990 | Potter et al. | 269/54.5 |
| 5,121,909 A | * | 6/1992 | Stickel, III | 269/289 R |
| 5,527,022 A | * | 6/1996 | Gibson | 269/13 |
| 5,984,294 A | * | 11/1999 | Bogomolny | 269/289 R |

* cited by examiner

*Primary Examiner*—Robert C. Watson
(74) *Attorney, Agent, or Firm*—Malin, Haley & DiMaggio, P.A.

(57) ABSTRACT

An elevated, portable non-slip cutting board for use in cutting and supporting foodstuffs, household and miscellaneous items comprising a rigid, planar base board to which is fixed numerous non-skid projections downwardly directed, spaced apart projections of such a height, width, and spatial arrangement as to provide support, stability, and the free flow of fluid underneath the cutting board and which provides enhanced traction to retard slippage of the cutting board during the cutting or support process, which may be formed by having a thermoplastic elastomer bonded to pre-molded convex protrusions supplied by pre-molded channels in the base of the cutting board. The board bottom can be molded with projections and supply channels for bonding with the non-skid material to reduce the expense of manufacture.

7 Claims, 9 Drawing Sheets

METHOD OF MANUFACTURING AN ELEVATED NON-SLIP CUTTING BOARD

This patent application is a Continuation-in-Part of Application Ser. No. 09/661,072 filed Sep. 13, 2000 now U.S. Pat. No. 6,478,292.

BACKGROUND OF THE INVENTION

1. Field of the Invention

This invention relates generally to a cutting board for safely supporting or cutting foodstuffs, household items and other materials. Safety results by employment of separated downwardly directed projections which form the traction surface which sufficiently raise the cutting board off the countertop, table top, or planar surface and provide a large cumulative gripping, non-slip traction area that is useful during the cutting or support process, allowing juice and other fluids to flow under the board and avoiding pooling under and around or planing of the board thereby minimizing the growth of microbes and diminishing the likelihood of a slippery and dangerous condition. The invention includes a method of forming a cutting board of reduced manufacturing costs.

2. Description of Related Art

Cutting boards are well known in the art and are primarily designed to provide a surface on which to cut food and other materials while protecting the countertop, but most fail to provide a reliably safer device. Cutting food stuffs and other materials is a potentially dangerous task, i.e. using a sharp knife or cleaver under pressure against often times frozen, hard, or cumbersome items, often in a wet environment created from fluids seeping from items during the cutting process and invariably without use of any safety or protective equipment or gear. Foods oozing fluids when cut are frequently encountered on cutting boards. The household kitchen counter is the most frequent surface on which such cutting occurs and family members during regular day to day meal preparation are the most frequent users. This environment and type of unprotected untrained user presents a situation which demands extra safety precautions.

The structure of cutting boards known in the art either fails to address this safety hazard or incompletely or inadequately solves the problem. For example, U.S. Pat. No. 5,984,294 issued to Bodomolny discloses a cutting board with a replaceable cutting surface and traction elements in the form of rubber feet individually attached, spaced rubber treads or rubber grip fastened by adhesives or stainless steel screws on the bottom surface. Bodomolny does not teach or suggest the use of unitarily molded traction elements, parameters related to height, quantity, spacing, shape, surface area, and the overall bottom surface configuration set forth in the present invention. Planing and reduced traction resulting from fluid dynamics as related to the available space under the cutting board and traction resulting therefrom are never addressed in terms of the height, number, configuration and individual shape of the projections, on which the present invention focuses.

U.S. Pat. No. 4,930,759 issued to Potter discloses a cutting board with a spiked platform to engage and retain food to be cut, a knife blade guide, a plurality of channeled depressions on the top surface for the temporary retention of juices and food related debris as opposed to the raised bottom surface for traction and to prevent slippage created by the planing effect of accumulated fluid in direct contact with the cutting board disclosed in the present invention. Potter provides a food retaining element that applies to the item to be cut as opposed to restricting movement of the cutting board apparatus on the countertop.

U.S. Pat. No. 5,527,022 issued to Gibson discloses a rectangular cutting board with a leveling component composed of a flexible, friction, enhancing material such as rubber, located at the four corners of the board.

The present invention enhances traction by increasing the number of surface area contacts with an overall plurality of convex projections (a minimum of 13 is preferred) molded as part of, and which are spatially arranged, and spaced apart over the entire bottom (underside) of the cutting board. The location, area, size and number of friction contacts in the present invention not only enhances the ability of the cutting board to support an item placed on the board surface, which is often heavy, but also increases the traction arising from the greater number of elevating contact points and greater surface area of the projections in contact with the countertop. When there are only a few projections located only at the corners, the cutting board may actually be subject to slippage arising not only, from the minimal number and amount of surface contact area, but also from the bowing of the cutting board under the weight of the item placed on the board surface. When an item to be cut is heavy, the weight, distributed in the central most portion of the cutting board, with support only at the four corners, without additional support underneath, may actually reduce surface area contact at the corners. Center weight compression caused the supports to tilt inwardly which not only decreases the amount of friction contact but also permits fluid to flow under the projections contact thereby allowing planing to occur. This situation may even worsen when the downward cutting force adds even more non-supported force directed centrally on the cutting board.

Applicant believes that when at least several friction contact projections providing a total predetermined surface area ratio to the total board area are spatially arranged over the entire bottom of the cutting board and are spaced apart, the weight of the item to be cut is not only supported directly thereunder, but also, the weight of the item enhances the force of frictional contact of the projections.

Although non-slip cutting boards have long existed as butcher block countertops and similar large, heavy and stationary devices, these devices take up space, are cumbersome, and neither portable nor easily or adequately cleaned, such as in a dishwasher.

The need arises not only, for a cutting board which provides overall traction and diminishes slippage of the board, but also enhances support of food or other materials over the entire cutting surface, and is elevated to channel fluids underneath the cutting board, is portable, space saving, dishwasher safe, and more sanitary.

SUMMARY OF THE INVENTION

A food cutting board comprising an elevated, non-slip cutting and support board having a base board fused with or fixedly attached to and supported by a bottom traction surface having a patterned plurality of spaced apart flexible projections with flat surfaces that provide a predetermined total surface area contact which grip the countertop surface for traction and for enhanced support of food or other objects, particularly in the central portion of the cutting board during the cutting process. Due to the elevated position of the cutting and support surface created by the plurality of projections, an area underneath the cutting board exists to accommodate and channel away juices and fluids.

The channels for fluids under the cutting board diminishes the likelihood of microbial growth on and around the board due to the increased flow and aeration available under the board rather than accumulating about the perimeter of the board nearer the food as is the situation when the cutting board sits flush on the countertop during use. The plurality of projections and the total surface area contact for traction reduces the likelihood of a planing effect which is more likely with no elevation of the cutting board above the countertop and/or friction contact projections located at only the four corners of the underside of the cutting board. The chance of slippage and potential for physical injury is reduced when planing is avoided. The elevation is such as to allow free flow of fluid and air thereunder but not so high as to complicate use or create instability.

This cutting board for inhibiting movement or slippage on the countertop, comprises a rigid, durable, flat, planar base board with an overlying, abutting, flexible bottom traction surface with downwardly directed, spaced apart projections of equal height, but which may be of equal or variable size and shape and which extend over substantially the entire bottom traction surface.

The preferred shape of the base board and traction surface is substantially rectangular, however any geometric shape, e.g. hexagonal, octagonal, circular, oval, triangular, rhomboidal, free form shape or shape designed to resemble animate or inanimate objects, could be used so long as sized to accommodate the material to be cut or supported.

A plurality of projections having substantially flat bottoms, preferably integrally molded and directed downwardly from the underside of the traction surface are of a height to allow sufficient fluid flow underneath while maintaining stability and ease of use. These projections are situated and spatially arranged uniformly or sporadically over substantially the entire underside of the traction surface in a manner that fosters stability and the free flow of fluid thereunder. The projections are preferably flat topped, cubic, truncated cone, pyramidical columnar, hemispherical, discoidal, polyhedral, discoidal, cylindrical, or in the form of longitudinal concentric or spiral ridges, or other 3-dimensional geometric or free form shape, configuration and dimension to elevate the base board off the support surface while providing support, traction and flow through spaces thereunder and a predetermined contact surfaced area available to engage the countertop.

An elevated, non-slip cutting board assembly which is composed of a durable, continuous, flat planar, rigid body having an upper surface suitable for engagement with a knife or other cutting blade and a base having a substantially planar cutting surface and an underlying, abutting traction component of shape and size identical to the base board. The traction component is comprised of a planar top surface and bottom surface having at least 13 downwardly directed, spaced apart projections of equal height, spatially arranged over and emanating from the bottom of the traction component and extending substantially out to and along the perimeter of said cutting board.

The spaced apart projections support and elevate the cutting board body above the countertop providing sufficient air channels under the cutting board to allow fluid to flow underneath the cutting board. The projections are spatially arranged over substantially the entire underside of the traction surface to provide a predetermined minimum amount of surface area engagement with a countertop surface for greater support and enhanced frictionally gripping of the cutting board with the countertop.

A more specific characterization of the present invention is that of an elevated, non-slip cutting board which is composed of a rectangular, substantially flat, polyethylene base board and an underlying, abutting flexible silicon bottom traction element of a shape substantially identical to the base board. The traction component has top and bottom flat surfaces. From the bottom surface of the traction component emanates a plurality of downwardly directed, spaced apart octahedron shaped projections of equal height, spatially arranged thereon and extending substantially to and along the perimeter of the cutting board. The total combined surface area of contact of the projections with the countertop as compared to the amount of overall planar area of the cutting board is between, 3:4 and 1:10. The cutting board further includes a human hand-sized opening for use as a handle for carrying, hanging, and stabilizing the cutting board during use.

Although the employment of a single sheet of molded traction non-skid material which can cover the entire bottom surface of the cutting board in a laminated fashion works extremely well, the non-skid material itself is quite expensive. Applicant has an improved method of manufacturing the cutting board that greatly reduces the volume of non-skid material employed without reducing the gripping action of the board. The cutting board itself is molded of a rigid waterproof, minimally porous, heat resistant, durable material such as polypropylene having in the molded process a plurality of convex circular projections uniformly distributed on one side of the board. The convex circular projections are spherical arcs in shape and are interconnected and surrounded by channels in a criss-cross network. The interconnecting channels or grooves act as flow channels when the traction material is secondarily molded and thermally bonded to the bottom of the cutting board, covering those convex areas that have the projections. This results in a highly effective friction surface but reduced cost for the cutting board.

The bottom side of the cutting board once molded and combined with the traction material provides significant traction with numerous spaced-apart support projections covered with a non-skid material.

The non-skid material is a resilient thermoplastic, high friction material that bonds and attaches chemically to the polypropylene board surface and in the grooves.

It is a general object of the present invention to provide a portable, dishwasher safe, elevated cutting board supported thereunder by a plurality of projections which grip the countertop, channel juices and excess fluids thereunder, provide greater support, reduce slippage, minimize the likelihood of microbal growth thereon or around, and which does not mar the countertop or surface on which the cutting board rests.

It is another object of this invention to provide a portable, elevated cutting board supported by a plurality of projections which grip the countertop that includes a plurality of convex projections that are molded and covered by a non-skid material through a plurality of recesses in the original molded cutting board, to greatly reduce the cost and the amount of non-skid material used without reducing the gripping action.

In accordance with these and other objects which will become apparent hereinafter, the instant invention will now be described with particular reference to the accompanying drawings.

DESCRIPTION OF THE PREFERRED EMBODIMENTS

Figure 1:
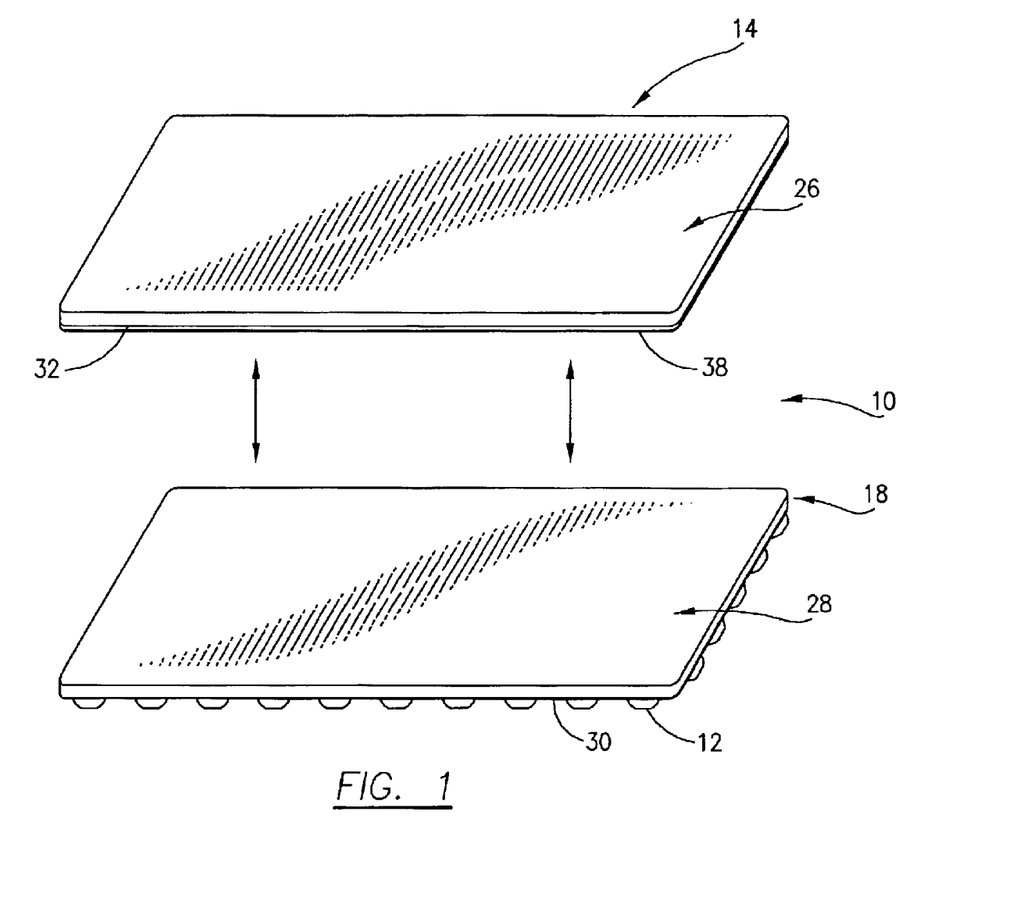
FIG. 1 shows an exploded perspective view of the present invention.

Referring now to the drawings which illustrate the preferred embodiment, FIG. 1, shows an exploded perspective view of the cutting board assembly shown generally at 10 which includes a base board 14, having a durable, rigid, substantially smooth, continuous, flat cutting surface 26 and smooth planar opposite bottom surface 32 for receiving the smooth, planar top side 28 of the flexible traction element 18 having an underside 30 with downwardly directed, spaced-apart flexible projections 12. The flexible traction element 18 with projections 12 is preferably unitarily molded, however, the projections 12, may be individually fixedly attached to the resilient, flexible traction element 18 such as by glue or heat. The base board bottom surface 32 and the top side 28 of traction surface 18 are of suitable size, shape, and surface texture as to receive each other in an abutting, layered fashion and with perimeter edges flush when affixed adjacent each other either by adhesive 38, by screws, bolts, clamps, heat fused or other waterproof or mechanical attaching means. The base board is formed of a substantially rigid, water proof, non or minimally porous, heat resistant durable material such as wood, rubber, plastics, acrylics, silicone, polyolefins eg. polyethylene and polypropylene, vinyls, olefins, polymers, styrenes, or a laminate of these materials, or other durable material which is approved for use in the food industry, but preferably polyethylene. The base board although preferably substantially rectangular in shape may also be substantially any geometric shape e.g., octagonal, hexagonal, diamond, circular, oval, triangular, or free form shape or even shaped to resemble animate or in animate objects.

Figure 2:
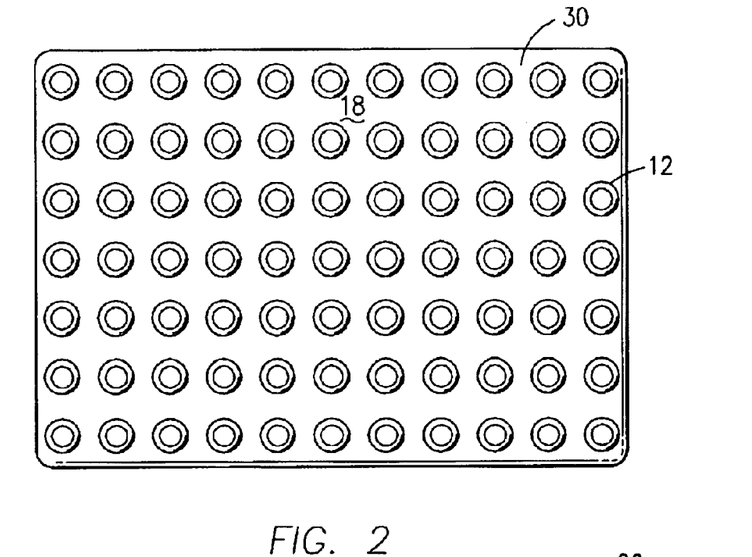
FIG. 2 shows a bottom plan view of the underside of the traction component in one embodiment of the present invention.
Figure 4:
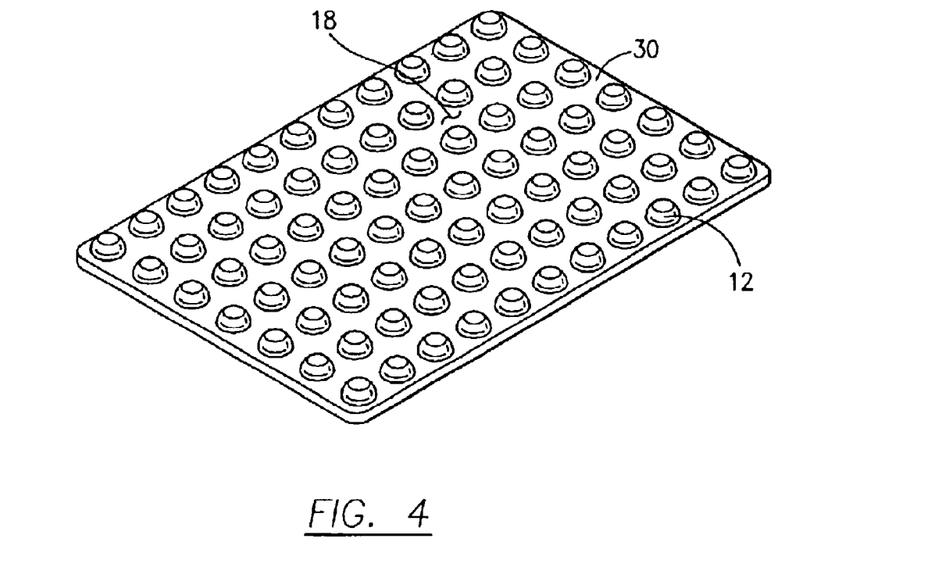
FIG. 4 shows a perspective view of the same embodiment shown in FIGS. 1, 2, and 3.

FIGS. 2 and 4 provide two views of the traction component shown with truncated hemispherical projections 12 in bottom plan view and perspective view respectively. The present invention, however, is not intended to be limited to this shape alone and should only be limited by the boundaries in the claims.

Figure 3:
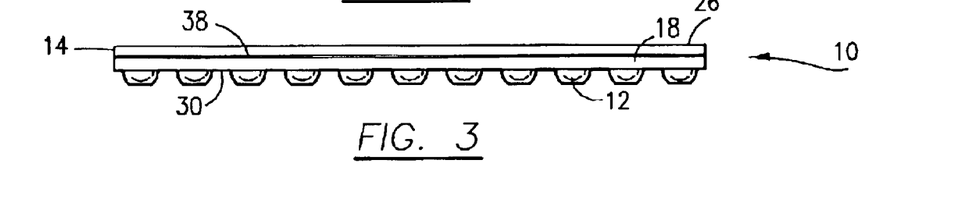
FIG. 3 shows a side elevational view of the same embodiment of the cutting board shown in FIG. 2.

FIG. 3 shows a side elevation of the cutting board 10 showing truncated hemispherical projections emanating from the underside 30 of traction surface 18. The base board 14 fits flush with adhesive 38 attaching traction element 18 to form the complete cutting board 10. Said traction element is a unitarily molded flexible material, such as plastics, polyolefins eg. polyethylene and polypropylene, silicone, vinyls, or natural or synthetic rubber which is capable of frictionally adhering to a countertop or other planar surface with sufficient drag or gripping ability as to prevent sliding or slipping, but not so as to mar the countertop or planar surface. Silicone is preferred because it is flexible and resistant to the heat level commonly encountered in dishwashers. From the underside 30 of traction surface 18 emanates at least thirteen projections 12, downwardly directed, with spaces between said projections uniformly or sporadically arranged over substantially the entire bottom surface 30 of said traction surface 18. Thirteen projections are believed to provide the minimum amount of surface area in contact with a countertop which would grip the countertop adequately by increasing the amount of actual contact surface area while allowing channeled fluid flow thereunder. The projections also preferably extend substantially out to and along the perimeter of the cutting board to provide enhanced stability of the cutting board at the edges The height of and space between the projections is such as to permit the flow of juices and other liquids under the cutting board and between the projections lessening the likelihood of planing which is frequently seen when the entire planar surface of the cutting board is in direct contact with a wet environment as commonly exists when cutting of foodstuffs.

The range of preferred height of the projections is between about 2.0 mm and 1.0 cm, and spaced apart at distances ranging between about 2.5 mm and 5 cm.

Figure 5:
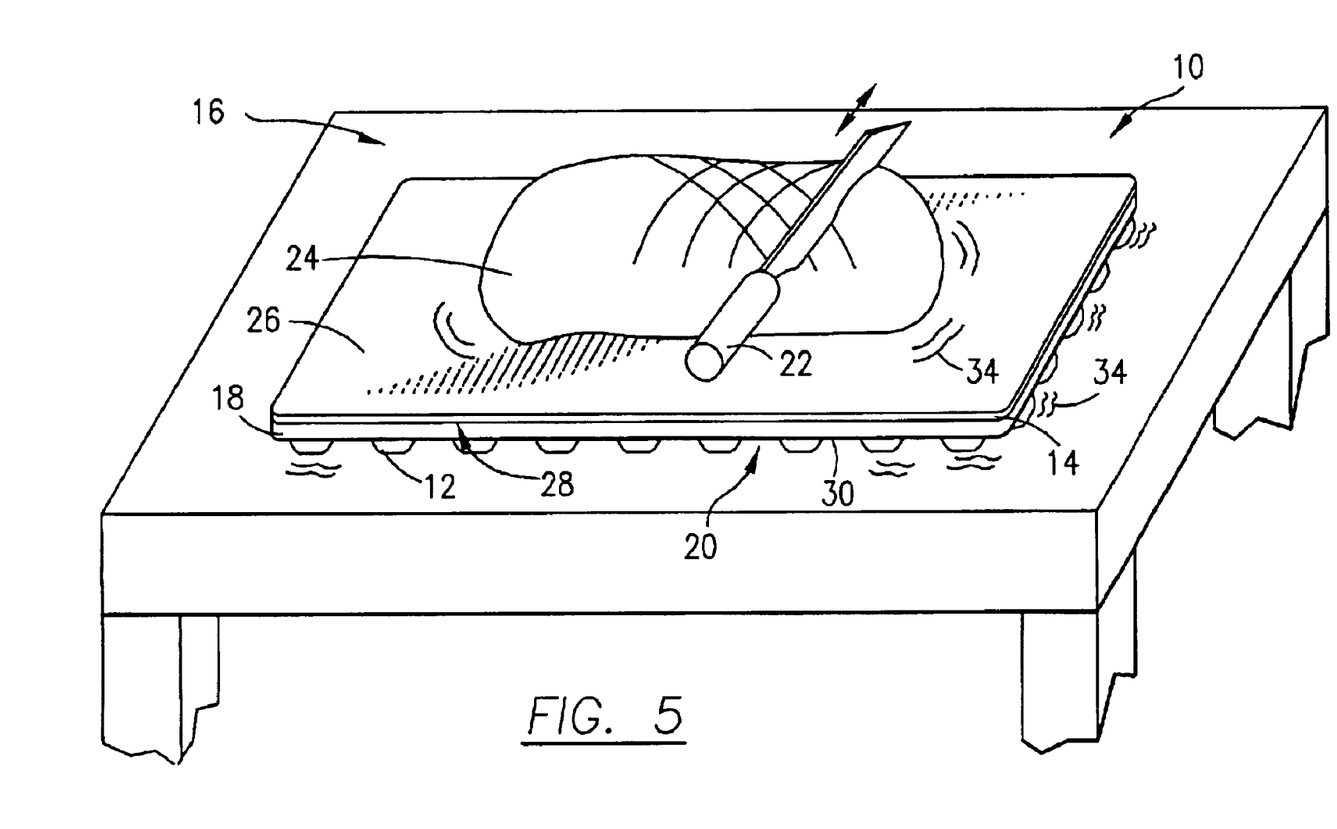
FIG. 5 shows a perspective view of the embodiment of FIGS. 1–4 of the present invention in use.

FIG. 5 discloses the cutting board 10 in use cutting meat 24 with knife 22. The cutting surface 26 of base board 14 is raised up above the countertop 16 leaving airspace 20 between the countertop and underside 30 of traction surface 18 to accommodate and channel away juices or liquid 34. The projections 12 are of sufficient height and width (overall contact surface area) to adequately grip the countertop or other support surface to avoid slippage and planing of the cutting board on the film of liquid 34. The plurality of projections 12 preferably extend over particularly the central portion of the underside 30 of the traction surface 18, for support and substantially out to the edges, for stability. The projections 12 can be arranged thereon in a linear pattern, a specific design, longitudinally, concentrically, diagonally or any free form configuration. The cutting board 10 is not screwed, nailed or otherwise anchored to the countertop, floor or other fixed location, so it can be easily lifted from the supporting surface when the need is satisfied or work is finished. The cutting or support board can then be satisfactorily and easily cleaned by hand or in a dishwasher, requires no disassembly, and can be easily stored or transported to the desired location.

The cutting surface 26 of base board 14 is preferably pebbled or textured, but may also be completely smooth, however smooth may not be as safe as a cutting surface of the pebbled or textured variety. The traction surface 18 is preferably flexibly smooth. The flexibility allowing for a gripping action of the projections at the surface on which the cutting board rests while in use. The length, width and overall shape of the base board and traction surface is preferably identical so as to create a smooth, flush well-fitting edge around the perimeter of the cutting board. The preferred base board dimensions are approximately 5 to 18 inches wide, approximately 7 to 20 inches in length, and approximately 0.25 inch to 0.75 inch thick. Most preferred approximate dimensions of the cutting board are 8 inches wide, 11 inches long and 0.45 inches thick. The traction surface is preferably not as thick as the base board, however, the traction surface could be equal to or greater in thickness than the base board. The preferred thickness of the traction means 18 including projections 12 being 0.2 inch. The base board and traction means are constructed preferably by injection molding, thermo-forming, or vacuum-forming, however, other methods known in the art could be used to formulate each of them into unitary structures or the two unitarily molded/fused together as one unit without the need for adhesive, screws, or other bonding means. The traction surface 18 is constructed of more flexible material than the base board. The base board 14, traction surface 18, and projections 12 can be clear, opaque colorless, mottled, colored, patterned, or designed and shaped to resemble, coordinate with, or match the decor, subject matter or theme.

The projections 12 are preferably polyhedral e.g. tetrahedron, pentahedron, octahedron, hexahedron, and or hemispherical, but may also be columnar, pyramidal, cylindrical, truncated cone, cubic, discoidal, free form or comprised of longitudinal, concentric or spiral ridges so long as they are of uniform height to insure stability and a substantially level cutting surface. It is believed that flat-topped projections, regardless of overall shape, provide more traction to the cutting board and are therefore preferred. FIGS. 1, 2, 3, 4 and 5 show truncated hemispherical projections, however, alternative embodiments are shown in FIGS. 6, 7, 8, and 9 as well as others disclosed herein, but which are not reflected in the drawings.

Whatever size or number of projections are utilized, it is believed that the greater the number of projections or a smaller number of projections with greater individual amount of actual surface area contact with countertop or support surface, the more gripping action there will be so long as spaces for fluids to flow remain between the projections. The plurality of and spaced arrangement of the projections over substantially the entire underside of the traction surface provides more physical support of the cutting board during forceful cutting which is customarily performed within the center most portion of the cutting surface. It is estimated that the ratio of the projections' surface area contact compared to the overall outside dimensional area (length times width) of the flexible traction surface is in the range of about 3:4 to 1:200 but preferably between 3:4 and 1:10.

It is important that the height of the projections be such that they serve to elevate the cutting board sufficiently above the countertop or support surface so that most fluids can flow easily under the cutting board.

Figure 6:
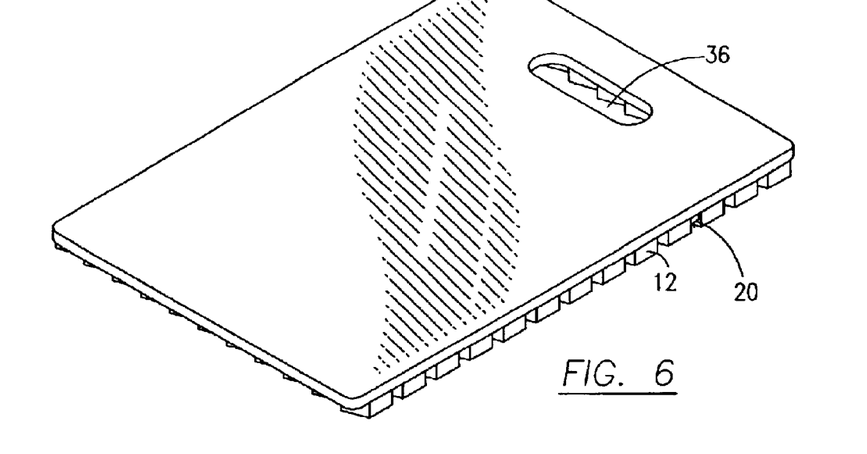
FIG. 6 shows a perspective view of a second embodiment of the present invention.

The cutting board preferably contains an opening 36 which extends through the base board 14 and the traction surface 18, of a shape and size sufficient to accommodate the grasp of a human hand as shown in FIG. 6. This opening should be situated so as to be used as a handle, for hanging, for carrying or for stabilizing the cutting board.

Figure 7:
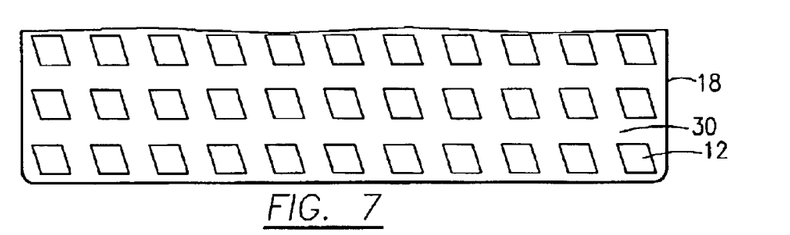
FIG. 7 shows a partial bottom plan view of third embodiment of the present invention.

The projections in perspective view in FIG. 6 and in partial bottom plan view in FIG. 7 are tetrahedral.

Figure 8:
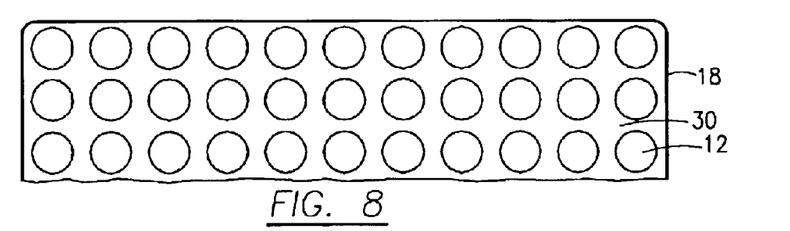
FIG. 8 shows a partial bottom plan view of the underside of third embodiment of the present invention.

FIG. 8 is a partial bottom plan view of a third embodiment wherein the projections 12 are discoid or cylindrical in shape.

Figures 9, 10:
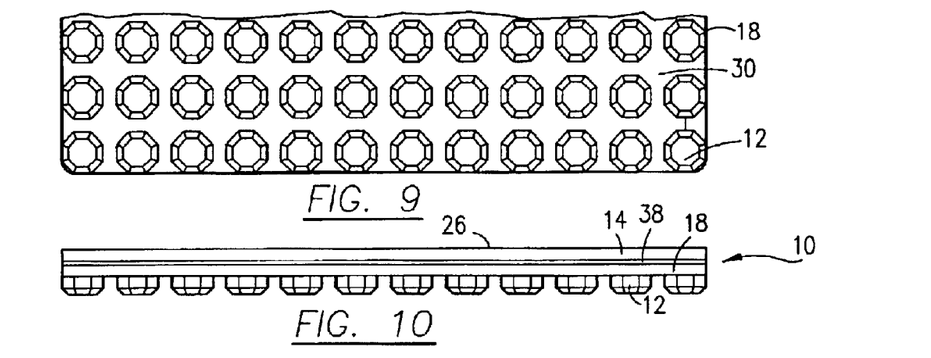
FIG. 9 shows a partial bottom plan view of the underside of fourth embodiment of the present invention.
FIG. 10 shows a side elevational view of the fourth embodiment of the cutting board shown in FIG. 9.

FIG. 9 is a partial bottom plan view of yet a fourth embodiment of the present invention showing the underside 30 of the traction element 18 with faceted octahedral shaped projections 12.

FIG. 10 is a side elevation the present invention with faceted octahedral projections shown in partial bottom plan in FIG. 9.

FIGS. 11A, 11B through 16 show an alternate embodiment of the invention to provide a non-skid cutting board having reduced non-skid material to reduce manufacturing costs.

The non-skid material is preferably a thermoplastic elastomer that is relatively inexpensive. Reducing the total volume of non-skid material per cutting board reduces the cost of manufacture of each cutting board significantly. The purpose of the alternate embodiment is to provide a non-skid cutting board and method of manufacture of reduced cost.

Figure 13:
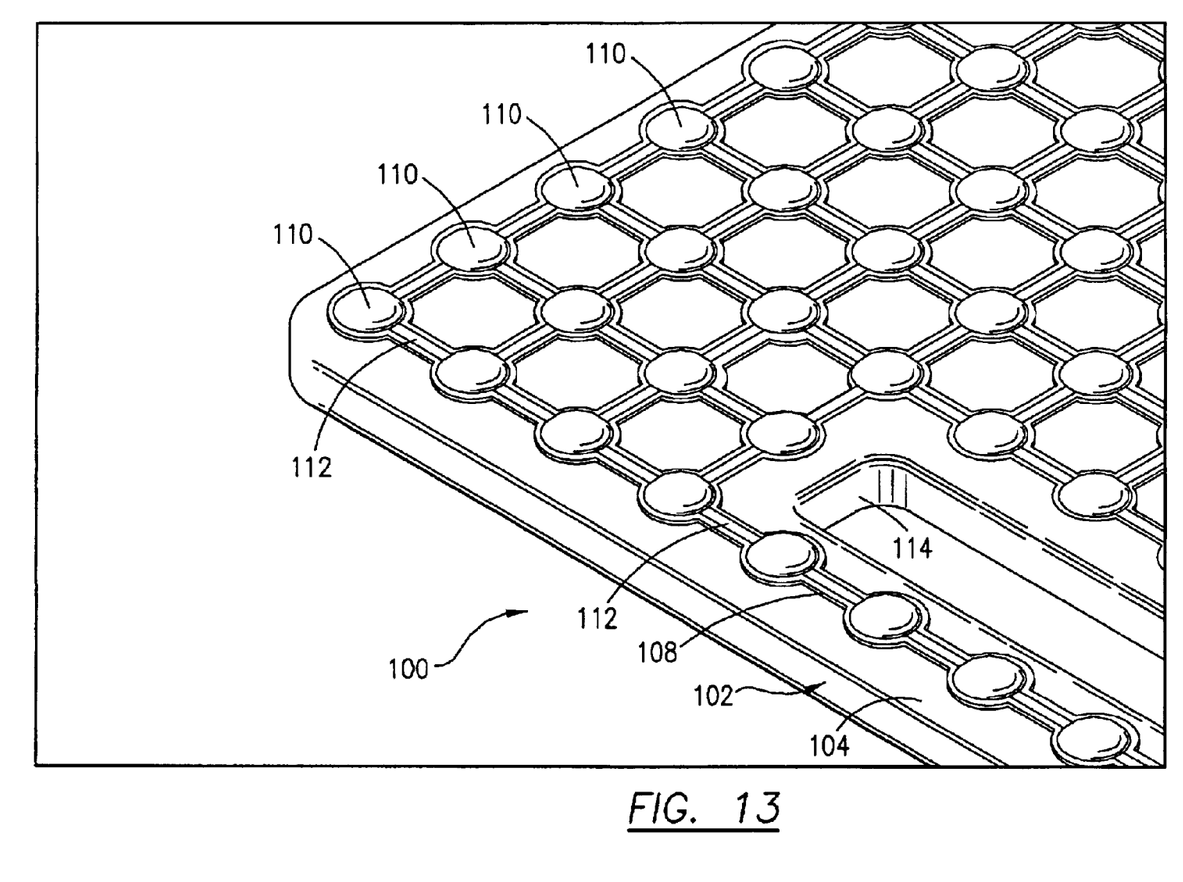
FIG. 13 shows a perspective view, partially cutaway of the bottom gripping side of the alternative embodiment of the invention with the gripping material thermally bonded to the cutting board projections.

The cutting board is manufactured in two steps or stages. The first step is to mold the cutting base board 102 shown in FIG. 11A. The second step is to mold and bond the non-skid material to the bottom side 104 of the cutting board that results in the final cutting board that is shown in FIG. 13. The bottom surface 104 of the cutting base board 102 has a plurality of molded convex projections 106 and access channels 108 molded or formed in the board surface 104. These projections 106 and channels 108 are formed at the same time that the base board 102 is formed. The projections 106 are preferably round, as shown; however, they may be formed of other geometry, such as conical sections or hexagons, including both regular and irregular shapes. It is not necessary that all of the projections 106 be the same shape. In the preferred embodiment, the U-shaped channels 108 have vertical sidewalls 108 which allow a thermoplastic elastomer non-skid material to be added to the bottom surface of the base board 102 to flow in the channels 108 and over the convex projections 106. The top surface of the cutting board 102 is the same as that shown in FIG. 1.

Figures 11A, 11B:
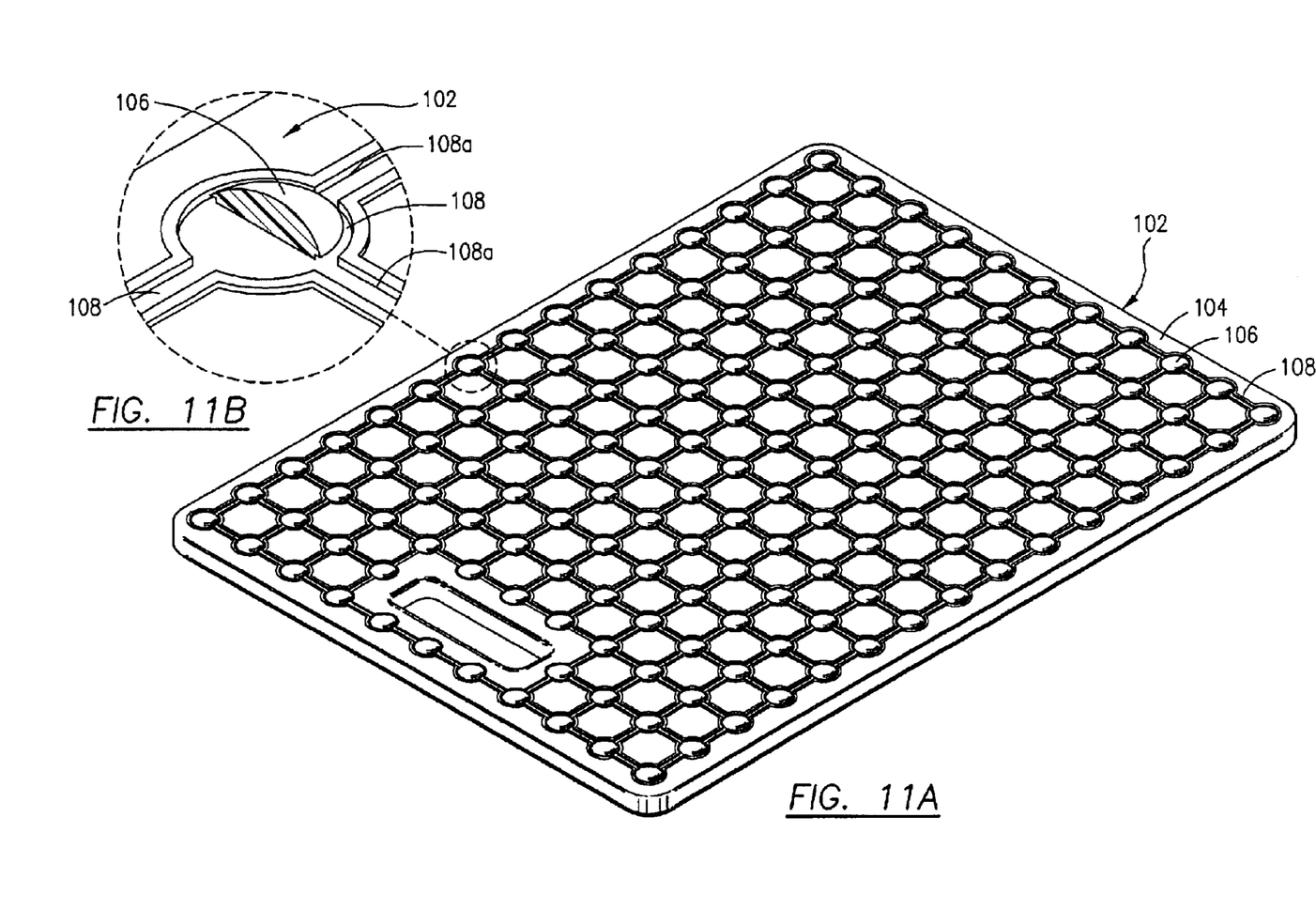
FIG. 11A shows a perspective view of another alternative embodiment of the invention showing the bottom surface of the cutting board including the non-skid molded convex projection covers.
FIG. 11B is a perspective cutaway view of one of the molded cutting board convex projection mounts and surrounding supply channels that receive non-skid material during the final molding and thermal bonding stage.

Referring now to FIG. 11B, one convex projection 106 is shown molded as part of the bottom surface of base board 102 before non-skid material is bonded or attached. Projection 106 is a circular, hemispherically-shaped, convex surface forming projection 106 that has been preformed to include non-skid material supply channels 108 including supply channel walls 108a that supply molten non-skid material during the manufacturing process throughout the board surface 104 to each convex projection surface 106 so that in a second mold, the non-skid material will coat and thermally bond to the surface of the convex projection 106. Although non-skid material remains in the supply channels 108, the total area of the non-skid friction surface is thus an array of numerous, non-skid projections 110 (FIG. 13) that include the non-skid material formed as a thin coating or thin layer on the surface of each convex projection 106. In the board 100 shown in FIG. 13, there are more than 100 convex non-skid projections.

As shown in FIG. 11A and FIG. 11B, this is the cutting base board 102 prior to having non-skid material added. This alternative embodiment is preferably constructed as follows. The base board 102 is molded as shown in FIG. 11A. The next step is to attach the non-skid material to the base board 102. The bottom surface 104 of the cutting board base board 102 forms a first half of a mold for the bonding of the non-skid material. A second half of a mold (not shown) is placed in complementary orientation with the bottom surface 104. A heated flowing, thermoplastic elastomer non-skid material is injected and passed within the channels 108 in the two halves of the joined upper mold and chemically bonds and adheres to the cutting base board 102 within the channels 108 and on the surface of the projections 106. When bonded and cured to the cutting board itself, the non-skid material is capable of frictionally providing sufficient drag or gripping ability to prevent sliding or slipping, even on wet countertop surfaces, but without marring or scratching a countertop or planar surface.

Figure 12:
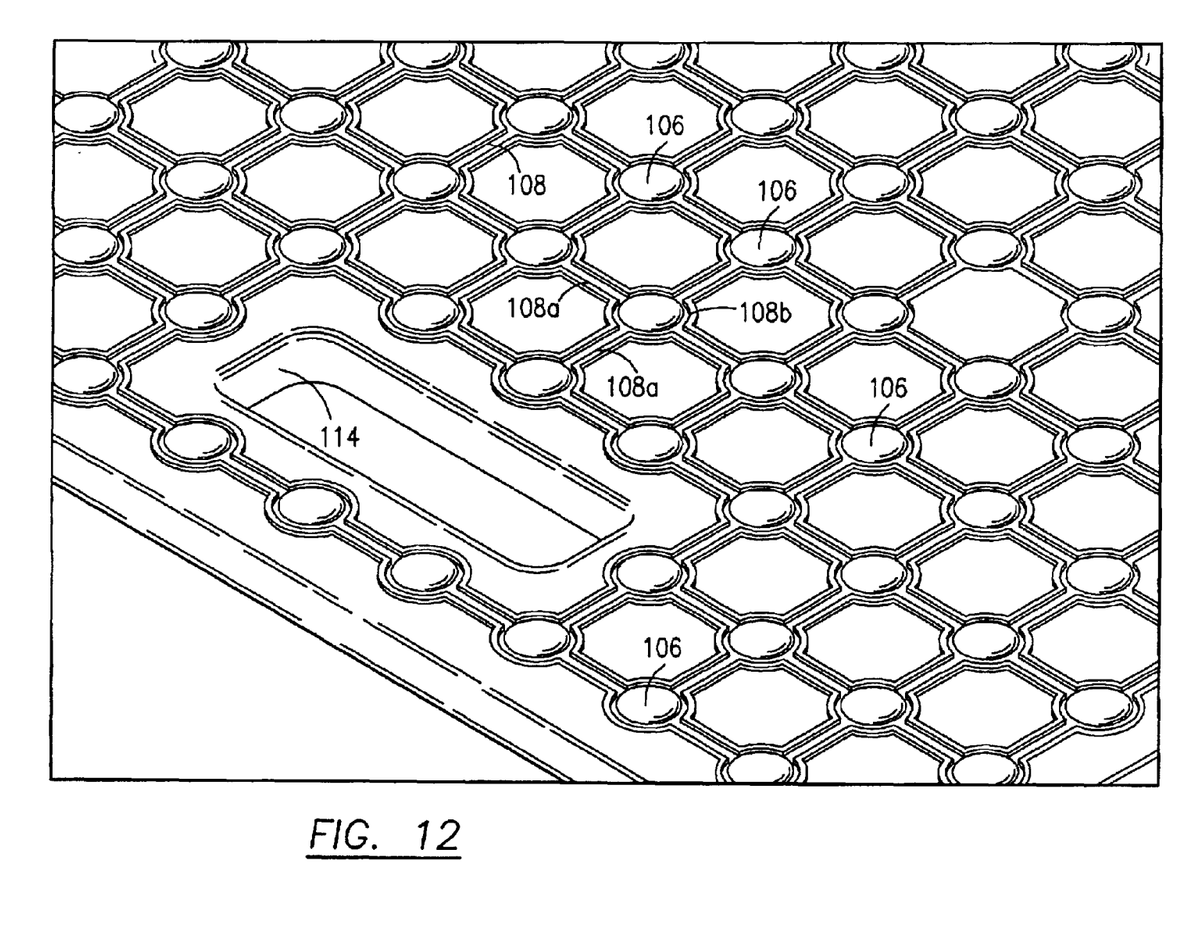
FIG. 12 shows a partially cutaway perspective view of the bottom side of the cutting board of the alternative embodiment of the invention before the addition of the gripping non-skid material.

Referring now to FIG. 12, a closer view of the bottom surface of the cutting board bottom side is shown without the non-skid material with the plurality of circular, hemispherically-shaped, convex projections 106 distributed uniformly throughout the total area of the board. A rectangular opening 114 acts to provide a handle at one end of the board. Each of the convex projections 106 are connected together by a plurality of channels 108, formed by linear raised walls 108a and arc-shaped or curved walls 108b. The curved arc portions 108b surround segments of the circular convex projections 106. The linear walls 108a provide passageways between the convex projections 106 that provide for the flow of molten thermoplastic elastomer that is used to form the non-skid or gripping material that is ultimately injected in a secondary molding process in conjunction with the bottom surface of the mold as seen in FIG. 12. Because of the inner-connecting channels 108, each of the channels 108 allow the molten thermoplastic elastomer to flow not only through the channels but to also completely cover the surface of the convex projections 106 to form a chemical bond, thermally affixing the non-skid thermoplastic elastomer material when the complimentary mold (not shown) is in place. Once the non-skid material is bonded, each of the channels 108 are filled with non-skid material. The elastomer material resides in channels 108 after the process is finished.

Referring now to FIG. 13, the alternate embodiment of the present invention shown in its final form as a cutting board 100 viewing the bottom side of the cutting board. As shown in FIG. 13, there are a plurality of convex non-skid caps 110, which through molding and chemically fusing on to the board surface 104, results in a plurality of numerous equally spaced apart circular, hemispherically-shaped, convex non-skid caps 110 which are joined by flat bands 112 of non-skid material connecting each of the caps 110 throughout the board surface. Only the non-skid caps 110 engage the countertop. In the preferred embodiment there are more than 100 separate non-skid caps 110 substantially equally spaced apart that constitute more than 25 percent of the surface area of the bottom surface of the cutting board, greatly enhancing the gripping force and uniformly distributing any weight and downward pressure applied on the board over the base of the board. An open rectangular aperture 114 forms a handle in the top portion of the board 102. Note that the cap non-skid material 110 which is bonded to the top of the convex projections (as shown in FIG. 12) element 106, rises quite a bit above the material 112 that resides in the channels 108, connecting the convex projections 110 caps together. Thus the primary non-skid contact, when the bottom of the board contacts a countertop or other surface of use, will be through the interaction of the non-skid material caps 110 as they grip against a countertop surface.

Figure 14:
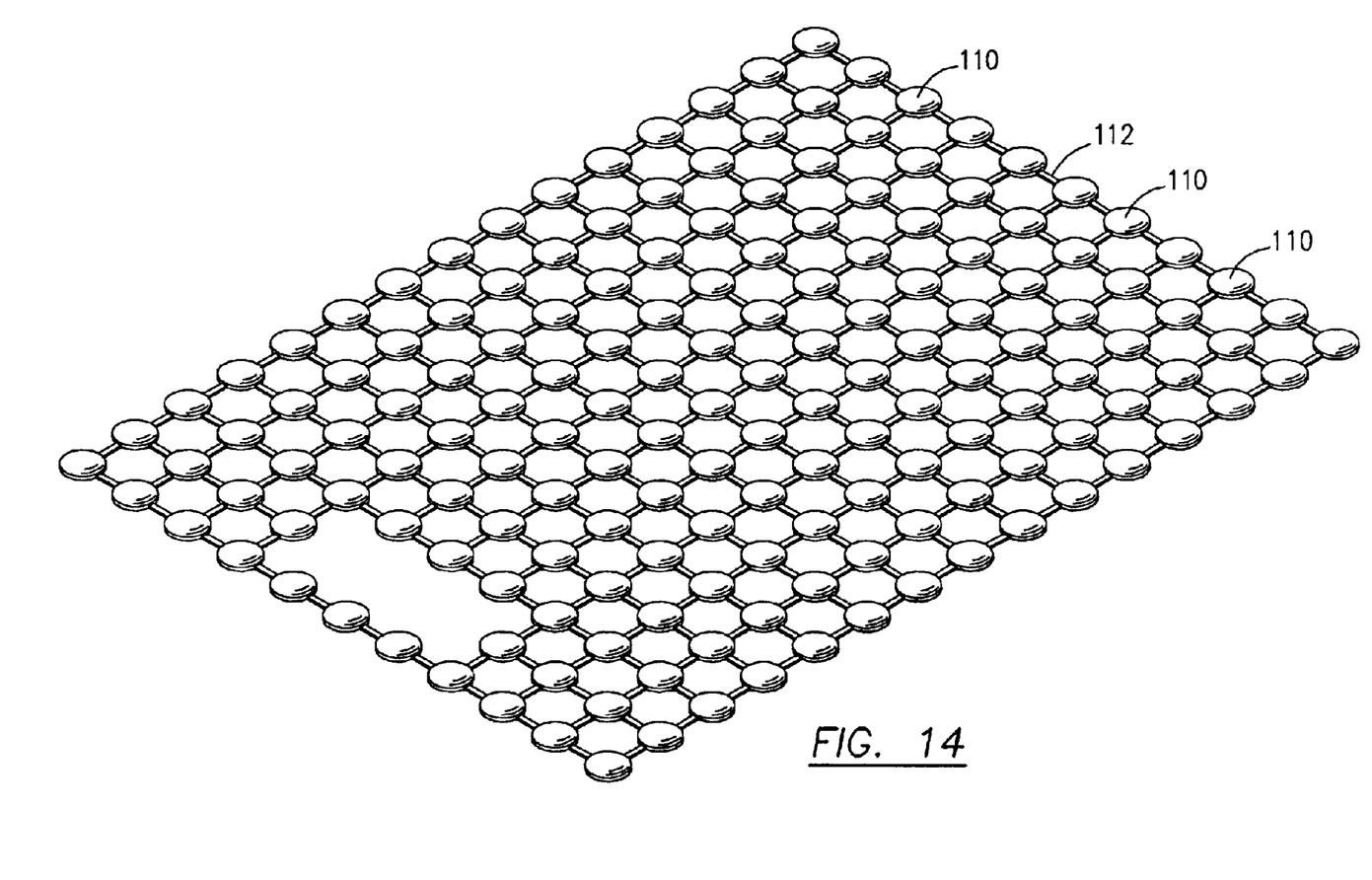
FIG. 14 shows a perspective view, of the gripping non-skid material used for the alternative embodiment of the invention as if the non-skid material were removable from the bottom of the cutting board.
Figure 15:
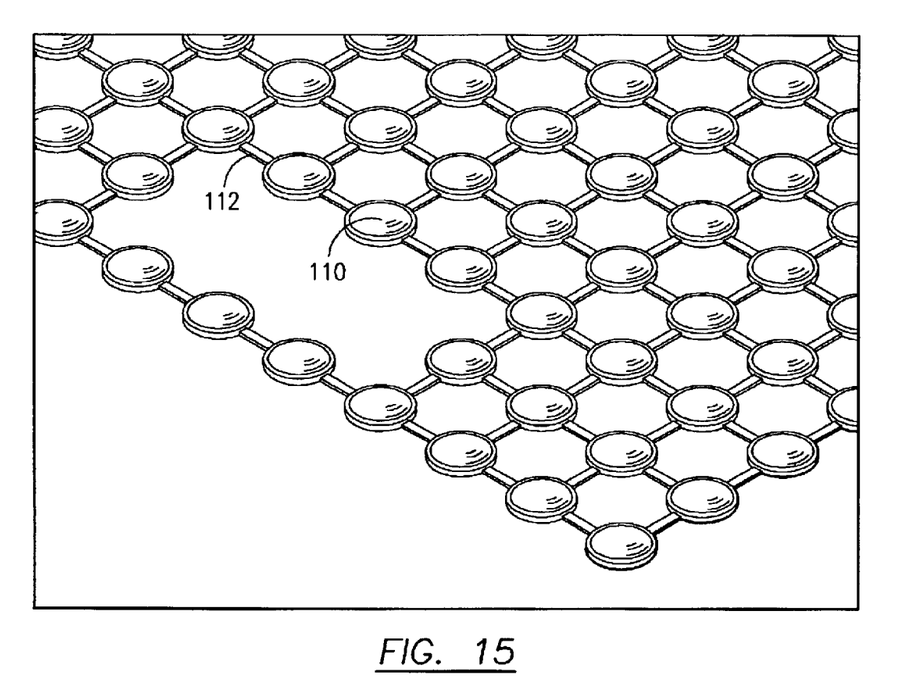
FIG. 15 shows a perspective view, partially cutaway, of the gripping surface for the alternative embodiment of the invention removed from the cutting board for illustration purposes only.

Referring now to FIG. 14 a theoretical view of the non-skid material is shown if one could remove the bonded thermoplastic elastomer caps 110 and channel material 112 from the actual cutting board itself. However, FIG. 14 does display the inter-connected network of the non-skid material as it would be molded together if it could be removed from the cutting board. The amount of non-skid material is compared with the laminate sheet of non-skid material shown in FIG. 4. A large saving of material is noted. FIG. 15 also shows a close up view of the non-skid material as it would appear if it could be carefully removed and separated from the cutting board. FIG. 15 is for illustration purposes only and shows the relationship between the thermoplastic elastomer caps 110 and the inter-connecting portions of non-skid material 112 as it would appear if the non-skid material could be removed from the cutting board.

Figure 16:
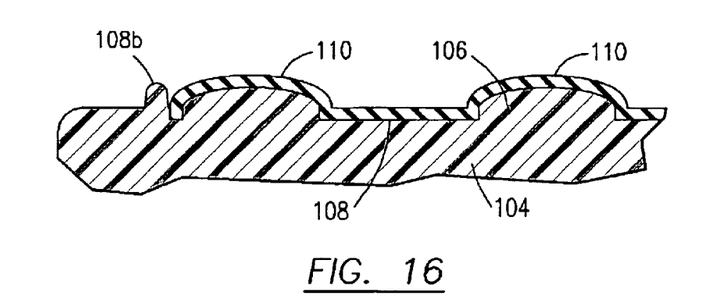
FIG. 16 shows a side elevational view and cross section partially cut away of the upper surface of cutting board with the non-skid material bonded to the projections.

FIG. 16 shows how non-skid cap 110 is bonded in a thin layer or coating to projection 106.

The purpose of the alternate embodiment of the invention that utilizes a polypropylene rigid molded cutting board having a smooth upper surface and a very well defined pre-molded bottom surface that includes a plurality of convex circular hemispherically shaped projections (at least 100 to 150 projections 110), all of which are interconnected by straight channels is that it eliminates the use of an entire sheet of thermoplastic elastomer material, greatly reducing the amount of thermoplastic elastomer material used to form the gripping surface on the cutting board. Because of the expensive nature of thermoplastic elastomer material, the cost of the manufacture of the cutting board can be substantially reduced without reducing the effective gripping surface and area of the cutting board.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A non-slip cutting board assembly comprising:

a rigid, durable base board having a substantially flat top cutting surface and a bottom surface having a plurality of pre-molded convex protrusions and supply channels connecting said protrusions; and a non-skid material bonded to said convex protrusions providing a predetermined surface area for traction.

2. The cutting board of claim 1, wherein the bottom surface of the base board further comprises supply channels that run between the convex protrusions.

3. The cutting board of claim 1, wherein the non-skid material is bonded to the bottom surface of the base board.

4. The cutting board of claim 2, wherein a gripping non-skid surface is formed by applying a non-skid material over said convex protrusions and into said supply channels of said base board, and subsequently applying a mold face against the bottom surface of the cutting board.

5. The cutting board of claim 4, wherein the non-skid material is bonded to the base board's convex protrusions and supply channels.

6. The cutting board of claim 1, wherein the convex protrusions are spherical arcs in shape.

7. The cutting board of claim 6, wherein the protrusions further comprise a central convexity.

* * * * *